United States Patent
McCurdy et al.

(10) Patent No.: US 6,265,076 B1
(45) Date of Patent: *Jul. 24, 2001

(54) ANTI-REFLECTIVE FILMS

(75) Inventors: Richard J. McCurdy; Ronald D. Goodman, both of Toledo; Michel J. Soubeyrand, Holland, all of OH (US)

(73) Assignee: Libbey-Owens-Ford Co., Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,943

(22) Filed: Dec. 9, 1998

Related U.S. Application Data

(60) Provisional application No. 60/073,936, filed on Feb. 6, 1998.

(51) Int. Cl.⁷ ................................................... B32B 15/00
(52) U.S. Cl. .................... 428/432; 428/428; 428/432; 428/213; 428/216; 428/701; 428/702; 359/359; 359/580; 359/582; 359/585; 359/586
(58) Field of Search ................................. 428/428, 432, 428/210, 213, 216, 701, 702; 359/359, 580, 582, 585, 586

(56) References Cited

U.S. PATENT DOCUMENTS

| | | |
|---|---|---|
| 4,943,140 | 7/1990 | Woodard et al. . |
| 5,106,671 | 4/1992 | Amberger et al. . |
| 5,170,291 | 12/1992 | Szczyrbowski et al. . |
| 5,171,414 | 12/1992 | Amberger et al. . |
| 5,194,990 | 3/1993 | Boulos . |
| 5,234,748 | 8/1993 | Demiryont et al. . |
| 5,245,468 | 9/1993 | Demiryont et al. . |
| 5,318,830 | 6/1994 | Takamatsu et al. . |
| 5,342,676 | 8/1994 | Zagdoun . |
| 5,481,402 | 1/1996 | Cheng et al. . |
| 5,491,570 | 2/1996 | Rakuljic et al. . |
| 5,491,580 | 2/1996 | O'Meara . |
| 5,520,996 | 5/1996 | Balian et al. . |
| 5,705,277 | 1/1998 | Marcquart et al. . |
| 5,733,660 | 3/1998 | Makita et al. . |
| 5,756,192 * | 5/1998 | Crawley et al. ..................... 428/216 |

FOREIGN PATENT DOCUMENTS

| | | |
|---|---|---|
| 0 515 847 A2 | 3/1992 | (EP) . |
| 0 708 063 A1 | 9/1995 | (EP) . |
| 7-315879 | 12/1995 | (JP) . |

\* cited by examiner

Primary Examiner—Deborah Jones
Assistant Examiner—Lymarie Miranda
(74) Attorney, Agent, or Firm—Marshall & Melhorn, LLC

(57) ABSTRACT

The present invention is an anti-reflective transparent article which includes a transparent substrate. The article also includes a first coating of metal oxide applied over the substrate. The first coating of metal oxide has a reflective index of about 1.8 to about 2.6. The article further includes a second coating of a metal oxide applied over the first coating of metal oxide. The second coating has a refractive index of about 1.44 to about 1.6. The reflectivity of the article, when measured at an angle of at least 50 degrees from normal, is at least three percentage points less than the reflectivity of the uncoated substrate at the same angle.

17 Claims, No Drawings

ANTI-REFLECTIVE FILMS

RELATED APPLICATIONS

This application is claiming the benefit, under 35 U.S.C. § 119(e), of the provisional application filed Feb. 6, 1998 under 35 U.S.C. § 111(b), which was granted a Ser. No. 60/073,936. The provisional application, Ser. No. 60/073,936, is hereby incorporated by reference.

BACKGROUND OF THE INVENTION

This invention relates to a multi-layer film stack suitable for use as an anti-reflective coating on a transparent substrate such as glass. More particularly, this invention relates to a multi-layer film stack which is applied onto a glass substrate to impart anti-reflective properties to a coated glass article which is normally viewed at a non-normal angle, such as a vehicle windshield.

Coatings on glass are commonly utilized to provide specific energy attenuation and light transmittance properties. Additionally, coatings are designed to reduce reflections from interfaces between individual coating layers and the glass when a plurality of coatings are applied onto a glass substrate. The coated articles are often utilized singularly, or in combination with other coated articles, to form a glazing.

The attributes of the resulting coated glass substrate are dependent upon the specific coatings applied to the glass substrate. The coating compositions and thicknesses impart energy absorption and light transmittance properties within the coated article while also affecting the spectral properties. Desired attributes may be obtainable by adjusting the compositions or thicknesses of the coating layer or layers.

Anti-reflective coatings on glass are utilized to reduce the surface reflection of optical components and to reduce the reflectance of an interface between optical media with different refractive indices. The reduction of visible reflection is achieved by the principle of optical interference. When light impinges on the air-film, film-film, and film-glass interfaces, a portion of the beam is reflected at each interface. By proper choice of thin film materials and thicknesses, the individual reflected light beams can destructively interfere, thereby reducing the observed visual reflectance. However, adjustments to enhance a specific property can adversely impact other transmittance or spectral properties of the coated glass article. Obtaining desired spectral properties is often difficult when trying to combine specific energy absorption and light transmittance properties in a coated glass article.

Conventional multi-layer anti-reflective films generally follow a standard design formula to optimize the reduction of visible light reflected from the interfaces of the coated glass substrate. The standard design parameters suggest the use of a two layer coating, of both high and low indices, with each coating having a thickness determined by $1/(4*n)$, where 1 is a design wavelength in the visible region, and n is the refractive index of the coating. These design parameters provide an anti-reflective film stack which minimizes visible reflection from the coated glass article at a normal angle which is normal to the glass article.

It would be desirable to manufacture an anti-reflective transparent substrate that is viewed, for the most part, at a non-normal angle.

SUMMARY OF THE INVENTION

The invention is an anti-reflective transparent article which includes a transparent substrate. The article also includes a first coating of metal oxide applied over the substrate. The first coating of metal oxide has a reflective index of about 1.8 to about 2.6. The article further includes a second coating of a metal oxide applied over the first coating of metal oxide. The second coating has a refractive index of about 1.44 to about 1.6. The reflectivity of the article when measured at an angle of at least 50 degrees from normal is at least three percentage points less than the reflectivity of the uncoated substrate at the same angle.

The anti-reflective transparent article of the invention is particularly well adapted for use as a vehicle windshield.

DETAILED DESCRIPTION OF THE PREFERRED EMBODIMENT

The coated glass articles produced in accordance with the standard anti-reflective film stack design have the generally desired effect upon the reflective properties for most applications of the coated glass articles. However, certain glass articles are intended to be viewed, for the most part, at a non-normal angle. A vehicle windshield is perhaps the best example of such a glass article. Such windshields are being installed in current vehicles at increasingly greater angles of installation and are therefore being viewed at angles farther and farther from normal. As a result, greater amounts of visible light are reflected from the vehicle dashboard and then off of the windshield into the eyes of the vehicle's driver and any front seat passengers.

While the application of conventional anti-reflective films to a vehicle windshield can serve to reduce the visible reflections, it has been determined that the anti-reflective effect can be optimized in such an application by selecting a multi-layer film stack having non-conventional layer thicknesses. Thus, in accordance with the invention, there is provided a multi-layer film stack for use as a coating on glass article intended to be viewed at a non-normal angle which provides improved reduction of the reflection of visible light at the intended viewing angle.

The multi-layer coating of the invention is applied over a transparent substrate, with a glass substrate being preferred. The glass substrates suitable for use in preparing the coated glass article according to the present invention may include any of the conventional clear glass compositions known in the art. The most preferred substrate is a clear float glass ribbon wherein the coating stack of the present invention, along with other optional coatings, is applied in the heated zone of the float glass process. However, other conventional processes for applying coatings on glass substrates are suitable for use with the present inventive coating. Additionally, colored glass compositions may be utilized with the anti-reflective coating of the present invention to achieve specific spectral and energy attenuation properties.

The first layer of the present invention is a high refractive index film of a metal oxide or doped metal oxide. The refractive index is generally about 1.8 to about 2.6. Preferred metal oxides, or doped metal oxides, include tin oxide, titanium oxide, or fluorine doped tin oxide. However, other conventional metal oxide films that have a refractive index within the specified range are suitable for use with the present invention. For example, other materials could include mixed metal oxides, oxy-nitrides, aluminum oxide, or tantalum oxide. The selection of a high refractive index material is relative to the low refractive index material utilized in the multi-layer coating.

The second layer of the anti-reflective coating is a metal oxide having a refractive index of about 1.44 to about 1.6. Preferably, silicon oxide is utilized as the second layer of the present invention. However, other metal oxides having low refractive indices are suitable for use with the present invention. The thicknesses of the first and second layers of the multi-layer coating are determined by the specific metal oxides employed and the angle at which resulting article is intended to be viewed.

The coating of the invention is especially useful for article intended to be viewed at an angle of at least 50 degrees from normal. At a viewing angle of at least 50 degrees from normal, the present inventive coating exhibits a reflectivity which is at least about 3 percentage points less than that of the uncoated substrate. As used herein, the term "reflectivity" is the total percentage of light reflected at a given angle over the visible wavelength range of 380 nm to 780 nm. At a viewing angle of at least 50 degrees from normal, the coating of the invention exhibits a color purity which is less than 10. Further, at a viewing angle of at least 60 degrees from normal, the coating of the invention may exhibit a color purity of less than 5.

The coatings employed in the invention are preferably deposited pyrolytically in an on-line process. For such pyrolytic deposition, the metal oxides or doped metal oxides of the present invention may be deposited onto the glass substrate through the use of conventional deposition precursors. An example for fluorine doped tin oxide would include the use of a fluorine source, vaporized and injected into a precursor gas stream containing dimethyltin dichloride, oxygen, and water in a helium carrier gas.

Additionally, a barrier layer may be applied to the glass prior to the application of the first metal oxide layer. Barrier layers may be utilized to prevent the migration of alkali metal ions from the glass substrate into the film. The migration of the alkali metal ions reduces the quality of the coated glass article and results in the undesirable appearance of haze in the article. A barrier layer is generally applied at about 100–200 angstroms thick. A preferred material for the barrier layer is silicon oxide.

The following examples are presented solely for the purpose of further illustrating and disclosing the present invention, and are not to be construed as limitations on the invention.

EXAMPLE 1

A float glass process was used to produce a clear float glass ribbon having a thickness of 0.125 inches. The glass ribbon was traveling at a line speed of about 433 inches per minute. A conventional coating apparatus was utilized in the float bath to apply a 185 angstrom thick coating of silicon oxide onto the surface of the float glass ribbon to act as a barrier layer. The coating was applied by directing to the surface 12 standard liters per minute (slm) of ethylene, 6 slm of oxygen, and 2 slm of silane $SiH_4$ in 535 slm of a nitrogen carrier gas.

A 1050 angstrom thick coating of fluorine doped tin oxide was applied onto the silicon oxide coating. This coating was applied by directing to the surface approximately 9 pounds per hour of dimethyltin dichloride, 270 slm of oxygen, 6 slm of hydrofluoric acid, and 150 cc per minute of water were provided in a 200 slm helium carrier gas.

A 1100 angstrom thick coating of silicon oxide was applied over the fluorine doped tin oxide film. This outer layer was applied by directing to the surface, in each of two conventional coaters, a precursor gas mixture containing 54 slm of ethylene, 27 slm of oxygen, and 9 slm of silane $SiH_4$ in a 535 slm of a nitrogen carrier gas.

The thicknesses of the various layers in the resulting coated glass article were selected to minimize reflectivity at a viewing angle of about 60 degrees. Such a coating may be applied, for example, to a vehicle windshield having a rake angle of about 28–30 degrees, and thus an installation angle of about 58–60 degrees.

When viewed at an angle normal thereto, the resulting article exhibited a 90.8% visible light transmittance with a color in accordance with the CIELAB Illuminant C 2 degree observer standard having an a* value of −1.33 and a b* value of 3.35. The reflectivity normal to the article was 6.4% with an a* value of 0.8 and a b* value of −14.7. The reflectivity and color purity exhibited by the coated article at various viewing angles is provided in Tables 1 and 2 respectively.

Comparative Example 1

The same methods as described in the above example were utilized to form a glass article having an anti-reflective coating designed to minimize the reflectivity at an angle normal thereto. The substrate was a clear float glass ribbon having a thickness of 0.125 inches. The multi-layer coating was a 185 angstrom thick coating of silicon oxide, a 1025 angstrom thick coating of fluorine doped tin oxide, with a 777 angstrom thick coating of silicon oxide was applied over the fluorine doped tin oxide film.

When viewed at an angle normal thereto, the resulting article exhibited a 92.3% visible light transmittance with a color in accordance with the CIELAB Illuminant C 2 degree observer standard having an a* value of −1.9 and a b* value of 2.4. The reflectivity normal to the article was 5.51% with an a* value of 5.6 and a b* value of −12.0. The reflectivity and color purity exhibited by the coated article at various viewing angles is provided in Tables 1 and 2 respectively.

Table 1 shows the reflectivity (Rf) for the coated articles of the above example and the comparative example, as well as for the uncoated glass substrate used in each, at various angles in degrees from normal. Table 1 also provides the difference in reflectivity between the coated article of each example and the uncoated glass substrate, again at various viewing angles.

TABLE 1

| Angle | $Rf^1$ | $Rf^2$ | $Rf^3$ | $Rf^3-Rf^1$ | $Rf^3-Rf^2$ |
| --- | --- | --- | --- | --- | --- |
| 0  | 5.51  | 6.39  | 8.7   | −3.19 | −2.31 |
| 20 | 6.46  | 7.03  | 9.14  | −2.68 | −2.11 |
| 30 | 6.93  | 7.16  | 9.55  | −2.62 | −2.39 |
| 40 | 8.34  | 8.1   | 11.09 | −2.75 | −2.99 |
| 50 | 11.24 | 10.49 | 13.83 | −2.59 | −3.34 |
| 60 | 16.67 | 15.25 | 18.89 | −2.22 | −3.64 |
| 70 | 26.33 | 24.08 | 27.68 | −1.35 | −3.6  |

[1] Reflectivity of the coated article of the Comparative Example 1.
[2] Reflectivity of the coated article of Example 1.
[3] Reflectivity of the uncoated glass substrate.

Table 2 shows the color purity, in accordance with the CIELAB system, for the coated articles of the above example and the comparative example at various angles, in degrees from normal.

TABLE 2

| Angle | Example 1 | Comparative Example 1 |
| --- | --- | --- |
| 0  | 5.89  | 7.44 |
| 20 | 12.33 | 22.6 |
| 30 | 11.3  | 19.5 |

TABLE 2-continued

| Angle | Example 1 | Comparative Example 1 |
|-------|-----------|----------------------|
| 40 | 9.0 | 14.5 |
| 50 | 4.8 | 9.6 |
| 60 | 7.0 | 4.9 |
| 70 | 6.6 | 2.8 |

EXAMPLE 2

Coated glass sheets were formed as in Example 1. A windshield was formed by laminating such a coated glass sheet with a 0.088 inch thick sheet of uncoated infrared and ultraviolet radiation absorbing green glass, sold commercially by Libbey-Owens-Ford Co. under the trademark EZ-KOOL, by means of an interlayer of polyvinyl butyral (PVB). The coating was positioned on the #4 surface of the windshield; that is, upon installation, the innermost or inboard surface thereof.

When viewed at an angle normal thereto, the coated glass sheet exhibited a 89.8% visible light transmittance with a color in accordance with the CIELAB Illuminant C 2 degree observer standard having an a* value of −1.1 and a b* value of 4.2. The reflectivity normal to the coated glass sheet was 7.2% with an a* value of −0.3 and a b* value of −16.9.

When viewed at an angle normal thereto, the resulting windshield exhibited a 81.0% visible light transmittance with a color in accordance with the CIELAB Illuminant C 2 degree observer standard having an a* value of −5.7 and a b* value of 6.5. The reflectivity normal to the windshield was 5.9% and had an a* value of −2.6 and a b* value of −18.6. The reflectivity exhibited by the windshield of Example 2 at various viewing angles is provided in Table 3.

Comparative Example 2

A windshield was formed by laminating an uncoated sheet of clear glass having a thickness of 0.125 inches with an 0.088 inch thick sheet of uncoated EZ-KOOL glass, by means of an interlayer of polyvinyl butyral (PVB).

When viewed at an angle normal thereto, the uncoated, 0.125 inch thick glass sheet exhibited a 89.3% visible light transmittance with a color in accordance with the CIELAB Illuminant C 2 degree observer standard having an a* value of −1.3 and a b* value of 0.0. The reflectivity normal to the coated glass sheet was 8.5% with an a* value of −0.6 and a b* value of −0.9.

When viewed at an angle normal thereto, the resulting windshield exhibited a 80.3% visible light transmittance with a color in accordance with the CIELAB Illuminant C 2 degree observer standard having an a* value of −5.9 and a b* value of 2.3. The reflectivity normal to the windshield was 7.4% with an a* value of −2.4 and a b* value of 0.1.

EXAMPLE 3

A windshield was formed by laminating two of the coated glass sheets used in Example 2 by means of an interlayer of polyvinyl butyral (PVB), with the respective coatings being on the #1 and the #4 surfaces of the windshield; that is, upon installation, the outboard and inboard surfaces of the laminate. Table 3 shows the reflectivity (Rf) for the windshields of Examples 2 and 3, as well as Comparative Example 2, at various angles measured in degrees from normal.

TABLE 3

| Angle | Rf[4] | Rf[5] | Rf[6] |
|-------|-----|-----|-----|
| 0 | 3.6 | 1.05 | 7.1 |
| 10 | 3.6 | 1.05 | 7.1 |
| 20 | 3.6 | 1.05 | 7.1 |
| 30 | 3.8 | 1.3 | 7.3 |
| 40 | 4.3 | 1.8 | 7.8 |
| 50 | 5.7 | 3.3 | 9.4 |
| 60 | 9.7 | 7.3 | 13. |
| 70 | 20.4 | 19.0 | 23.4 |

[4]Reflectivity of the windshield of Example 2.
[5]Reflectivity of the windshield of Example 3.
[6]Reflectivity of the windshield of Comparative Example 2.

In accordance with the provisions of the patent statutes, the present invention has been described in what is considered to represent its preferred embodiment. However, it should be noted that the invention can be practiced otherwise than as specifically illustrated and described without departing from its spirit and scope. For example, other coating methods, such as sputtering, may also be utilized to form the coatings of the invention.

What is claimed is:

1. An anti-reflective transparent article intended to be viewed at a non-normal angle, comprising:
   a transparent substrate having a reflectivity;
   a first coating of a metal oxide applied over said substrate, said first coating of metal oxide having a refractive index of about 1.8 to about 2.6; and
   a second coating of a metal oxide applied over said first coating, said second coating of metal oxide having a refractive index of about 1.44 to about 1.6;
   wherein the thicknesses of said metal oxides forming said first and second coatings are selected so that the reduction in reflectivity between the coated article and the uncoated substrate is at a maximum at a selected non-normal angle.

2. An anti-reflective article as recited in claim 1, wherein the selected non-normal angle is at least 50 degrees from normal.

3. An anti-reflective transparent article as recited in claim 1, wherein said substrate is glass.

4. An anti-reflective transparent article as recited in claim 1, wherein said first coating of metal oxide is a doped metal oxide.

5. An anti-reflective transparent article as recited in claim 1, wherein said first coating is fluorine doped tin oxide having a refractive index of about 1.82, and said second coating is a silicon oxide having a refractive index of about 1.45.

6. An anti-reflective transparent article as recited in claim 1, wherein the color purity thereof, when measured at an angle of least 50 degrees from normal, is less than 10.

7. An anti-reflective transparent article as recited in claim 2, wherein the color purity thereof when measured at an angle of least 60 degrees from normal, is less than 5.

8. An anti-reflective transparent article as recited in claim 1, further comprising a barrier layer applied between said transparent substrate and said first coating of metal oxide.

9. An anti-reflective transparent article as recited in claim 1, wherein said barrier layer is $SiO_2$ having a thickness of between about 100 and 200 angstroms.

10. An anti-reflective transparent article as recited in claim 1, wherein said substrate is a float glass ribbon and said coatings are deposited pyrolytically onto said float glass ribbon.

11. An anti-reflective transparent article as recited in claim 2, wherein said glass is clear.

12. An anti-reflective transparent article as recited in claim 2, wherein said glass is colored.

13. An anti-reflective windshield adapted to be installed in a vehicle at an installation angle of 50 degrees or more, comprising:

a first glass sheet having first and second major surfaces;

a first coating of a metal oxide applied over the first major surface of said first glass sheet, said first coating of metal oxide having a refractive index of about 1.8 to about 2.6;

a second coating of a metal oxide applied over said first coating, said second coating of metal oxide having a refractive index of about 1.44 to about 1.6;

a second glass sheet having first and second major surfaces;

a third coating of a metal oxide applied over the first major surface of said second glass sheet, said third coating of metal oxide having a refractive index of about 1.8 to about 2.6;

a fourth coating of a metal oxide applied over said third coating, said fourth coating of metal oxide having a refractive index of about 1.44 to about 1.6; and a polymeric interlayer adhered to the respective second major surfaces of said first and second glass sheets;

said windshield having a reflectivity measured at an angle of at least 50 degrees from normal which is at least three percentage points less than the reflectivity of the uncoated windshield measured at the same angle, and wherein the thicknesses of said metal oxides are selected so that the reduction in the reflectivity between the windshield and the uncoated substrate is at a maximum at a selected non-normal angle.

14. An anti-reflective transparent article intended to be viewed at a non-normal angle, comprising:

a transparent substrate having a reflectivity;

a first coating of a doped metal oxide applied over said substrate, said first coating of metal oxide having a refractive index of about 1.8 to about 2.6; and a second coating of a metal oxide applied over said first coating, said second coating of metal oxide having a refractive index of about 1.44 to about 1.6;

wherein the thicknesses of said metal oxides forming said first and second coatings are selected so that the reduction in reflectivity between the coated article and the uncoated substrate is at a maximum at a selected non-normal angle.

15. An anti-reflective transparent article as recited in claim 13, wherein said second coating of metal oxide is an undoped metal oxide.

16. An anti-reflective transparent article as recited in claim 14, wherein said second coating of metal oxide is an undoped metal oxide.

17. An anti-reflective article as recited in claim 14, wherein the selected non-normal angle is at least 50 degrees from normal.

* * * * *